United States Patent [19]
Ohara

[11] Patent Number: 5,388,920
[45] Date of Patent: Feb. 14, 1995

[54] PRINTER WITH COMMAND SYSTEM SELECTION

[75] Inventor: Kiyotaka Ohara, Nagoya, Japan

[73] Assignee: Brother Kogyo Kabushiki Kaisha, Nagoya, Japan

[21] Appl. No.: 176,071

[22] Filed: Dec. 30, 1993

[30] Foreign Application Priority Data

Feb. 17, 1993 [JP] Japan .................................. 5-051348

[51] Int. Cl.$^6$ .............................................. B41J 5/00
[52] U.S. Cl. ...................................... 400/76; 400/61; 395/112
[58] Field of Search ........................... 400/61, 70, 76; 395/112, 114

[56] References Cited

U.S. PATENT DOCUMENTS

| | | | |
|---|---|---|---|
| 4,648,047 | 3/1987 | Berkland | 400/70 |
| 4,968,159 | 11/1990 | Sasaki et al. | 400/76 |
| 5,100,248 | 3/1992 | Cripe | 400/76 |

*Primary Examiner*—Edgar S. Burr
*Assistant Examiner*—Steven S. Kelley
*Attorney, Agent, or Firm*—Oliff & Berridge

[57] ABSTRACT

A printer has a collective mode for searching a print control program adapted to the processing of print data from a number of print control programs stored in a printer and a combination mode for searching an adapted print control program from combinations of predetermined print control programs. The modes are selected by a key of a switch panel. From the print data, the control code for determining the print control command system is analyzed, and a print control program adapted to the analyzed control code is searched from the print control programs of each mode. This system enables the accurate determination of a print control program adapted to a print data processing a number of print control programs having different command systems for print control.

9 Claims, 8 Drawing Sheets

PRINTER WITH COMMAND SYSTEM SELECTION

BACKGROUND OF THE INVENTION

1. Field of the Invention

This invention relates to a printer with a number of print control programs having different command systems and, particularly, to a printer in which a selection range for the print programs adapted to print processing is set to all of the print control programs, yet can be limited to a part of the print control programs.

2. Description of Related Art

In companies, personal computers or work stations have been recently introduced in association with the development of office automation. At the same time, these computers are connected to high-speed printers, such as laser printers, dot printers or the like, through the same cable used to configure a network system in which desired print data stored in the computers are transmitted to enable print processing using a desired printer.

For each printer, a number of print control programs having different command systems for print control are installed into a control device of the printer. On the basis of transmitted print data, a print control program adapted to the print processing can be selectively and manually set from the print control programs using an operation panel or automatically set by an automatic selection mode.

When the automatic selection mode is set, all of the print control programs installed into the control device are set as a selection target. A print control program having a control code coincident with a print control code contained the print data is finally determined as a print control program adapted to the print processing. So, the print data is subjected to the print processing using the suitable print control program thus determined.

In general, a large number of print control programs, such as a print control program of a command system that is optimally designed for document data, a print control program of a command system for a plotter used in a CAD field, and a print control program of a command system used for a print operation of a complicated image (picture), are practically used as the print control programs. Some of these print control programs are very similar to one another in the kind of print data and its field.

As described above, in the automatic selection mode for automatically selecting the print control program, all of the print control programs installed into the control device are set as the selection target. Therefore, very similar print control programs may be simultaneously installed in the different print control programs. In this case, a print control program that is similar to an originally suitable print control program can be erroneously automatically selected according to the number or kind of print control codes contained in the print data.

SUMMARY OF THE INVENTION

An object of this invention is to provide a printer in which a print control program adapted to print processing of print data can be accurately determined.

To achieve the above and other objects, a printer is employed including a data receiving interface, operation mode storing means for storing plural print control programs corresponding to plural kinds of external equipment having different command systems for print control, and print means for printing a character or an image on a print medium using one of the print control programs on the basis of print data that is received through the interface. The printer includes analyzing means for analyzing a control code for determining a print control command system in the print data. Setting means selectively sets a collective mode for collectively specifying all of the plural print control programs stored in the operation mode storing means and a combination mode that is a combination of a part of the plural print control programs. Determination means determines a print control program adapted to the control code analyzed by the analyzing means from the print control programs specified by the collective mode or the combination mode. Instructing means instructs the print means to carry out a print processing using the print control program determined by the determination means.

According to this invention, the collective mode for collectively specifying all of the plural print control programs stored in the operation mode storing means and a combination mode that is a combination of a part of the plural print control programs are selectively set by the setting means. Since the analyzing means analyzes the control code for determining the print control command system from the print data received through the data receiving interface, the determination means determines the print control program adapted to the control code analyzed by the analyzing means from the print control programs specified by the collective mode or combination mode. Subsequently, the instructing means instructs the print means to carry out the print processing using the print control program determined by the determination means. So, the print data prints a character or image on a print medium using the determined print control program on the basis of the received print data. As described above, the print control program of the command system adapted to the control code contained in the print data is determined from the print control programs specified by the collective mode or the combination mode. Therefore, in this combination mode, the dissimilar print control programs are specified in combination, and, by setting this combination mode, the print control program adapted to the print processing of the print data can be accurately determined.

As described above, according to this printer the analyzing means, setting means, determination means, instructing means, and the combination mode obtained by combining a part of the plural print control programs are provided. Therefore, by setting this combination mode, the print control program of the command system adapted to the control code contained in the print data is determined from the print control programs specified in this combination mode. Thus, the print control program adapted to the print processing of the print data can be accurately determined. In this combination mode, it is assumed that the specified print control program contains those print control programs that are not similar to one another.

DETAILED DESCRIPTION OF PREFERRED EMBODIMENTS

Preferred embodiments according to this invention are described referring to the accompanying drawings.

The preferred embodiment is applied to a laser printer LP for receiving document data or image data from external equipment such as a host computer to carry out a print operation.

Figure 1:
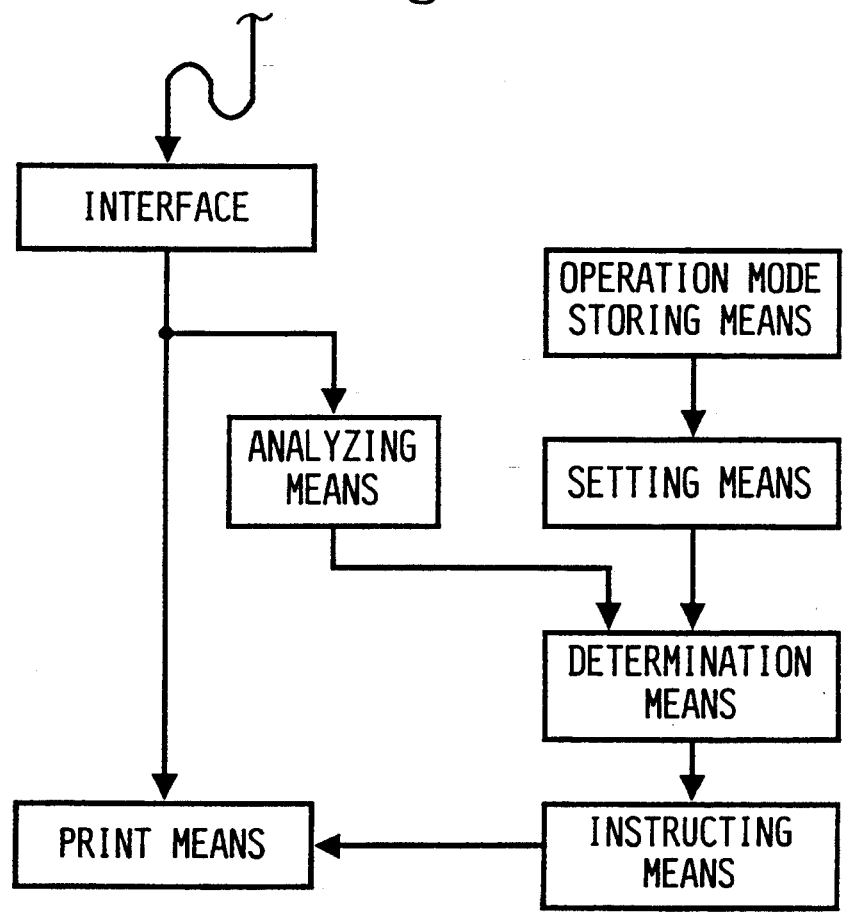
FIG. 1 is a functional block diagram showing the construction of the printer according to the preferred embodiment.
Figure 2:
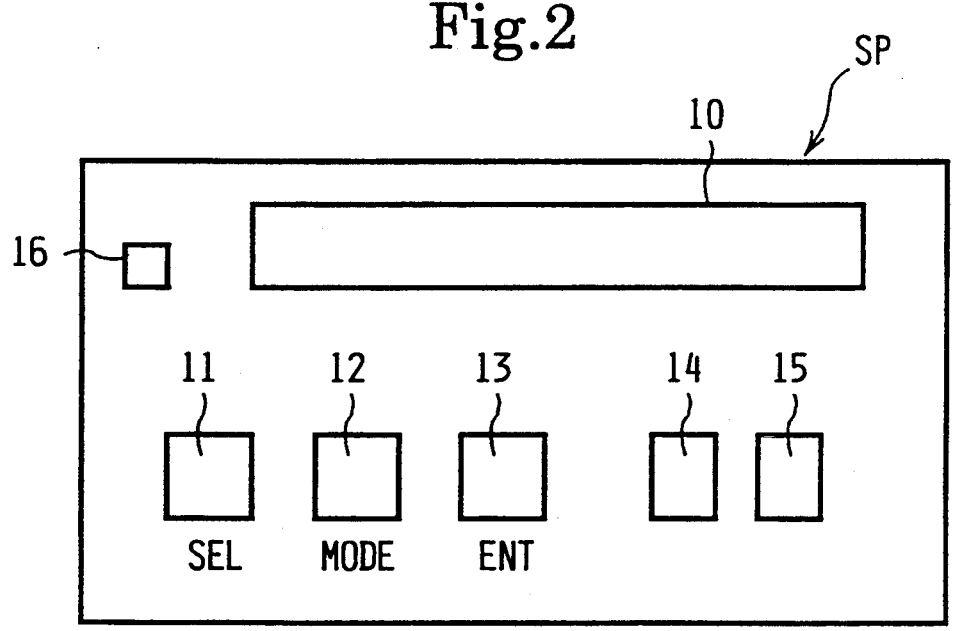
FIG. 2 is a schematic plan view of a switch panel.

As shown in FIG. 2, a switch panel SP of the laser printer LP is provided with a liquid crystal display 10 on which a plurality of characters such as Katakanas, numerals and symbols can be displayed. The switch panel SP includes a select key 11 for alternately switching on-line and off-line, a mode key 12 for altering a selection setting of plural operation modes provided to the laser printer LP and the set contents, an enter key 13 for shifting to a lower hierarchy, a next display key 14 for successively switching the setting contents of first, second and third operation modes to display it on the display 10, and a previous display key 15. An on-line lamp 16 is turned on through manipulation of the select key when it is in the on-line state.

Figure 3:
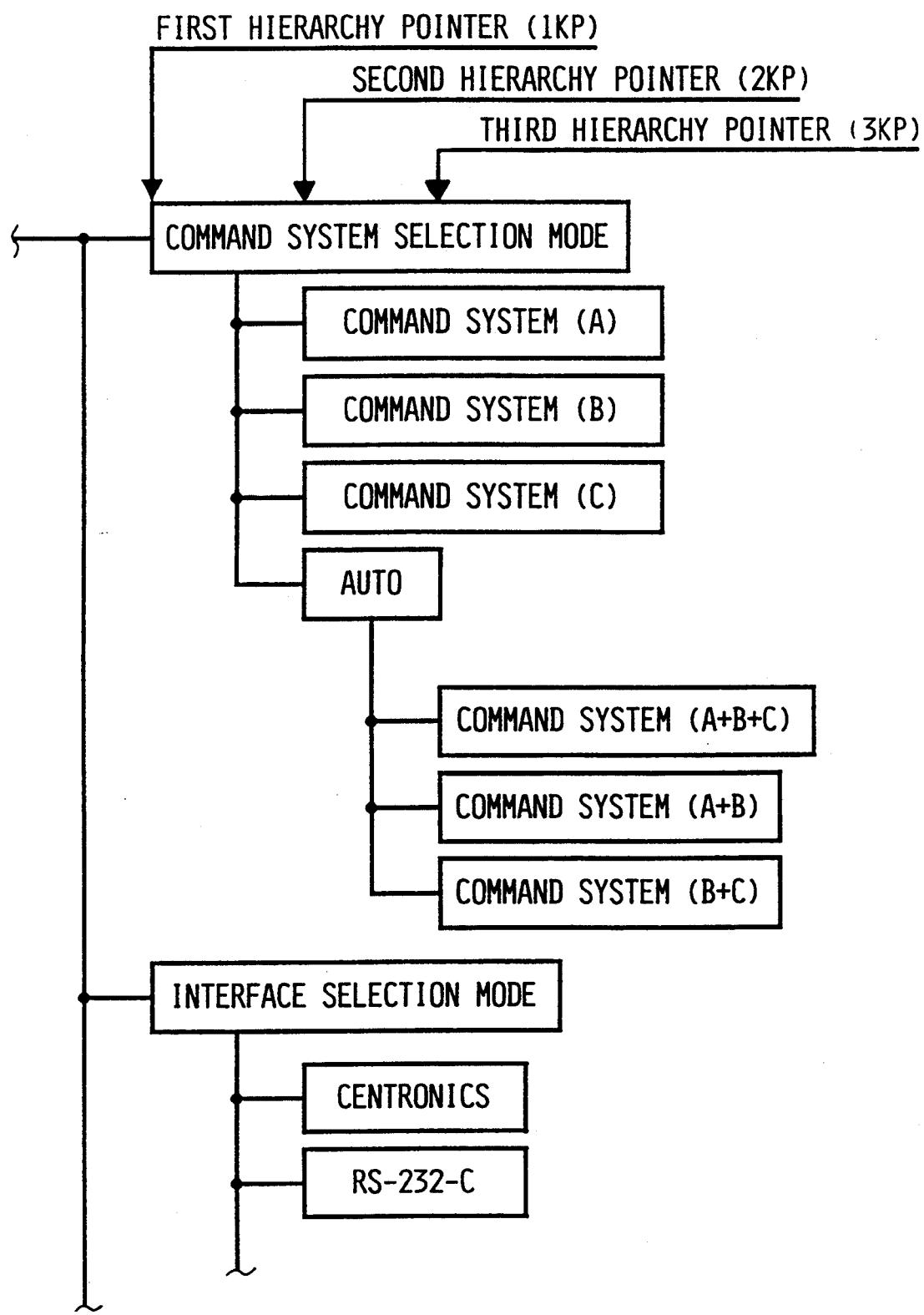
FIG. 3 is an explanatory block diagram showing the hierarchical structure of the plural operation modes.

Next, the operation modes of the hierarchical structure in the laser printer LP is described referring to FIG. 3. First, the select key 11 is switched from the on-line state to the off-line state. The mode key 12 is manipulated to switch the mode to an operation mode setting possible state, so that an operation mode name "command system selection mode" at the head of a first hierarchy (referred to as "1 K") is displayed. Every time the next display key 14 is manipulated, first operation mode names of the first hierarchy such as "interface selection mode", etc. are successively displayed. Further, every time the previous display key 15 is manipulated, the first operation mode names are successively displayed in the inverse order to that when the next display key 14 is manipulated.

On the other hand, a second hierarchy (referred to as "2 K") of the "command system selection mode" has four second operation modes, "command system (A)", "command system (B)", "command system (C)" used as an individual mode for selectively setting each of three kinds of print control command systems, and "automatic mode" used to automatically set one print control command system.

Further, a third hierarchy (referred to as "3 K") of the "automatic mode" has three operation modes, command system (A+B+C)", which is a collective mode for collectively indicating all of the three kinds of print control command systems, "command system (A+B)", which is a first combination mode of two of the three kinds of print control command systems and "command system (B+C)", which is a second combination mode. Other first hierarchy operation modes include "interface selection mode", "sheet size setting mode", "format setting mode", etc. The description thereof is omitted because they do not directly relate to this invention.

As described above, the plural operation modes in the hierarchical structure are provided to the laser printer LP. Accordingly, for example, to set "command system (A+B)" in the "automatic mode", "command system selection mode" is first displayed by manipulating the mode key 12. Then, the state is shifted to the next lower hierarchy by the manipulation of the enter key 13. At this time, the previously-set command system mode, for example, "command system (B)", is displayed. Thus, the "automatic mode" is selected by manipulating the next display key 14 twice and then manipulating the enter key 13 to shift the state to the next hierarchy to display "command system (A+B+C)" at the head of the third hierarchy. By manipulating the next display key 14, the first combination mode "command system (A+B)" is selected. It is set by the manipulation of the enter key 13. Subsequently, the on-line state is set by manipulating the select key 11.

Here, as shown in FIG. 3, pointer values of the first hierarchy pointer 1 KP, the second hierarchy pointer 2 KP and the third hierarchy pointer 3 KP are altered and set in accordance with manipulation of the enter key 13, the next display key 15 and the previous display key. These pointer values 1 KP, 2 KP and 3 KP are stored into an operation mode memory of a RAM 28 as described later.

Figure 4:
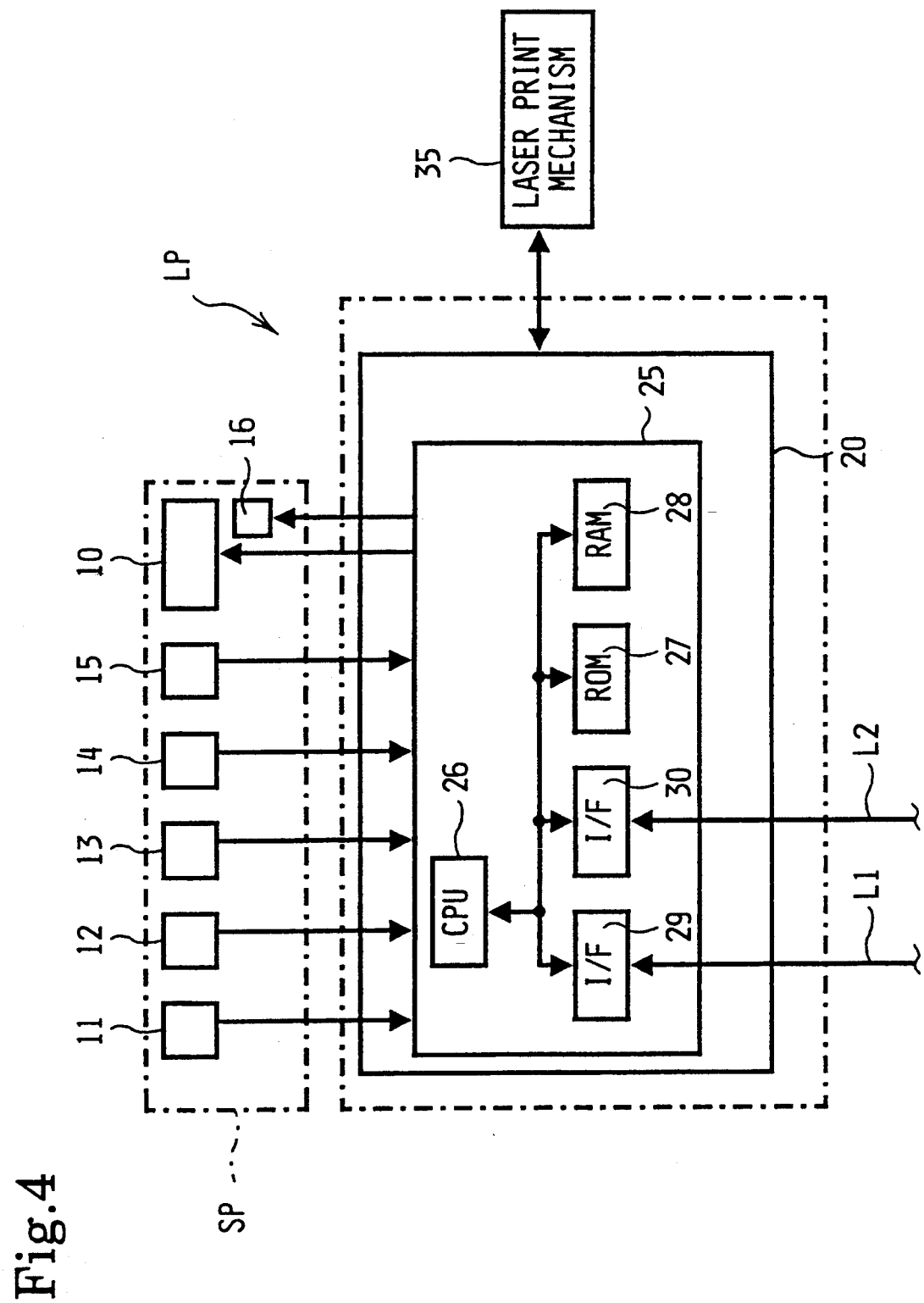
FIG. 4 is a block diagram showing a control system of a laser printer.
Figure 5:
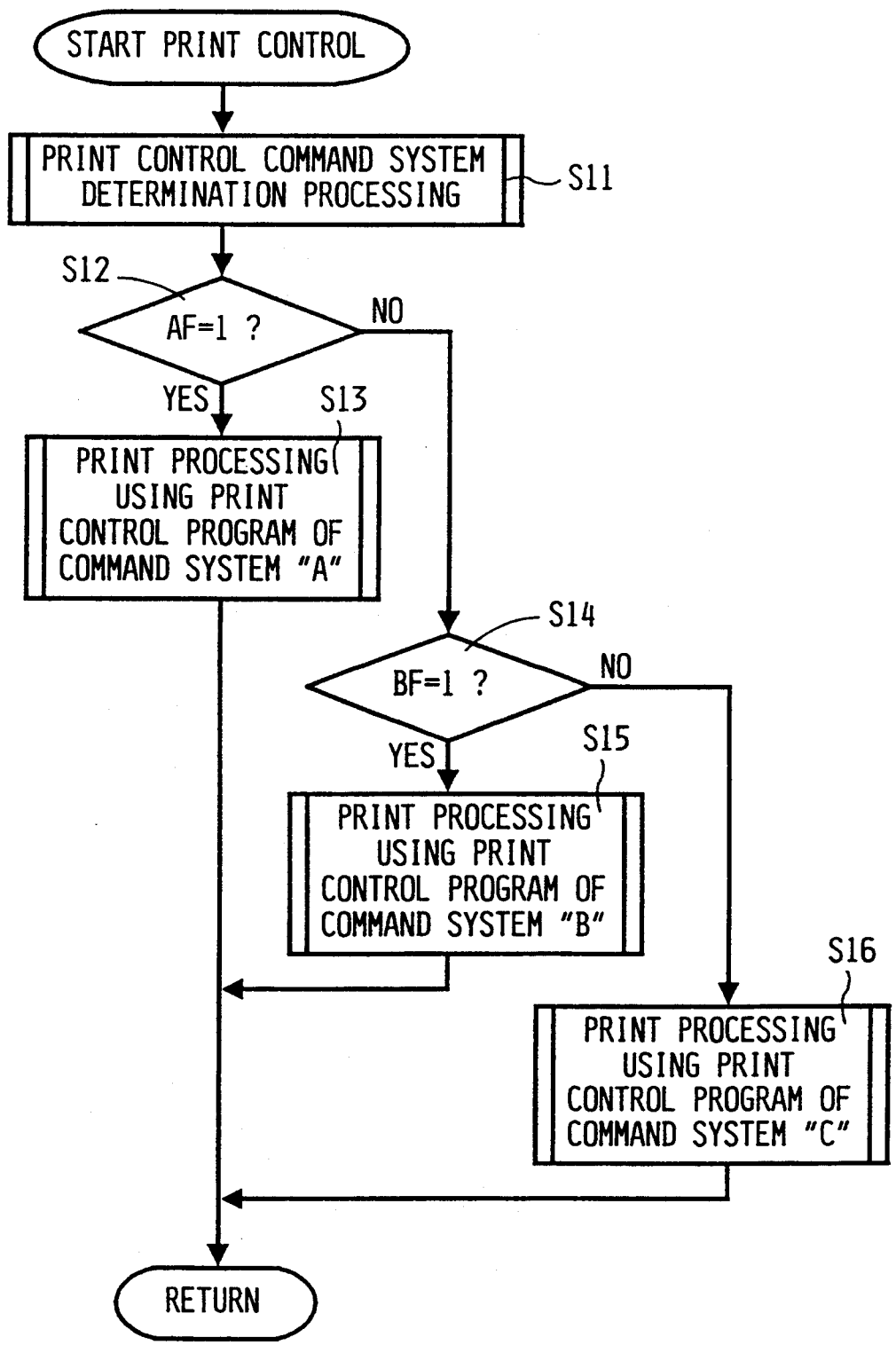
FIG. 5 is a flowchart for the routine of a print control.
Figure 6:
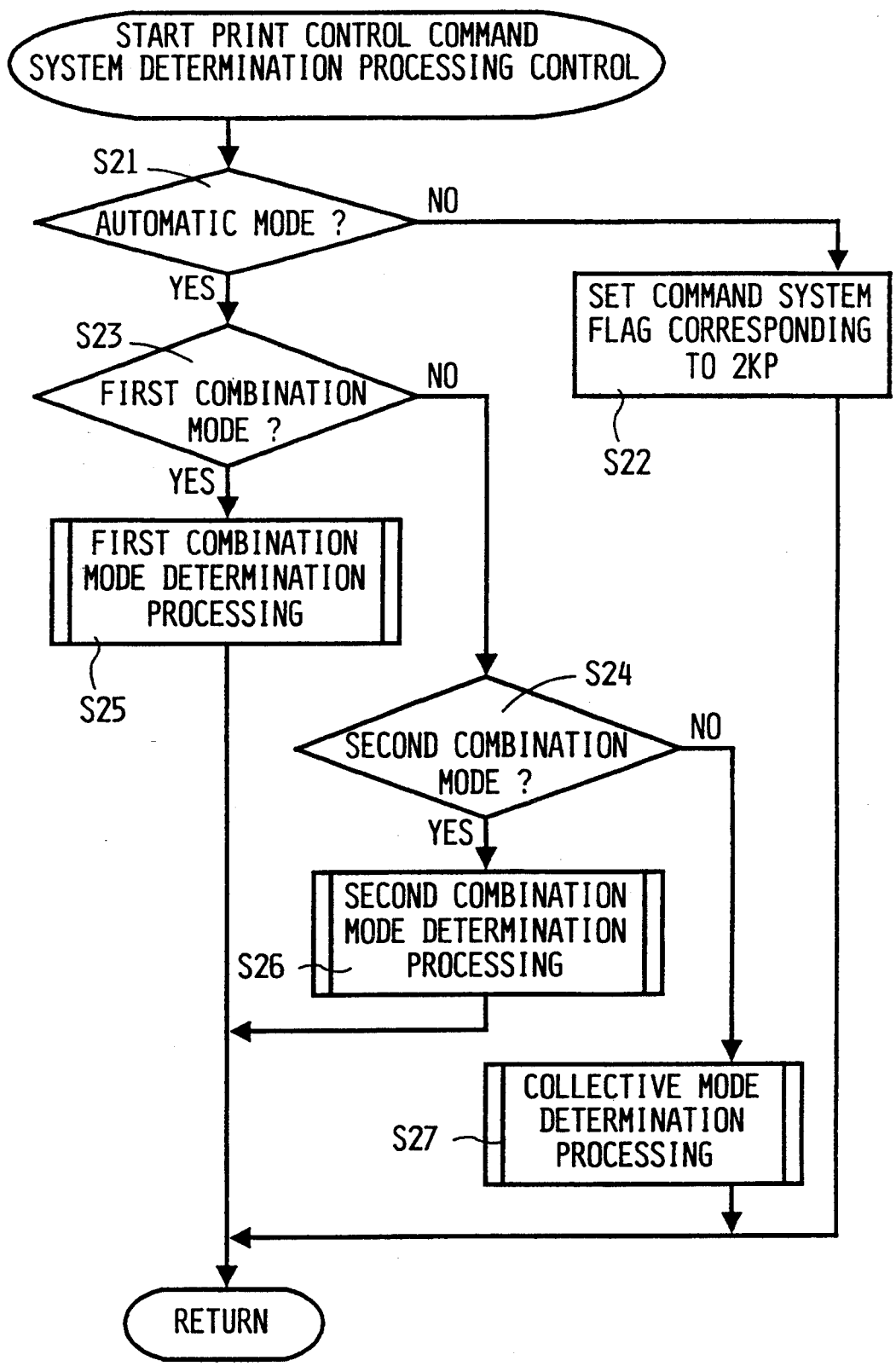
FIG. 6 is a flowchart for the routine of a print control command system determination processing control.
Figure 7:
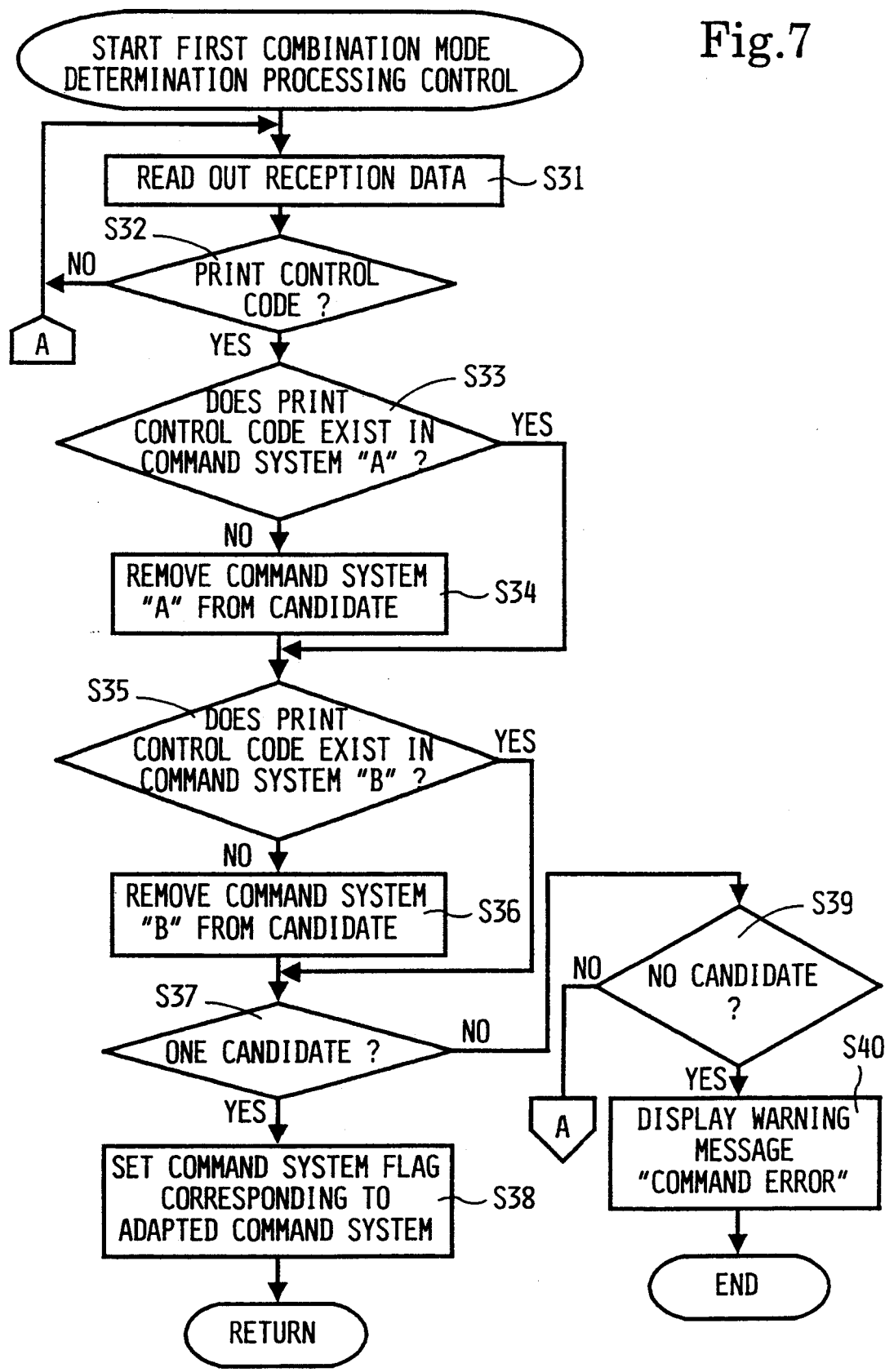
FIG. 7 is a flowchart for the routine of a first combination mode determination processing control.
Figure 8:
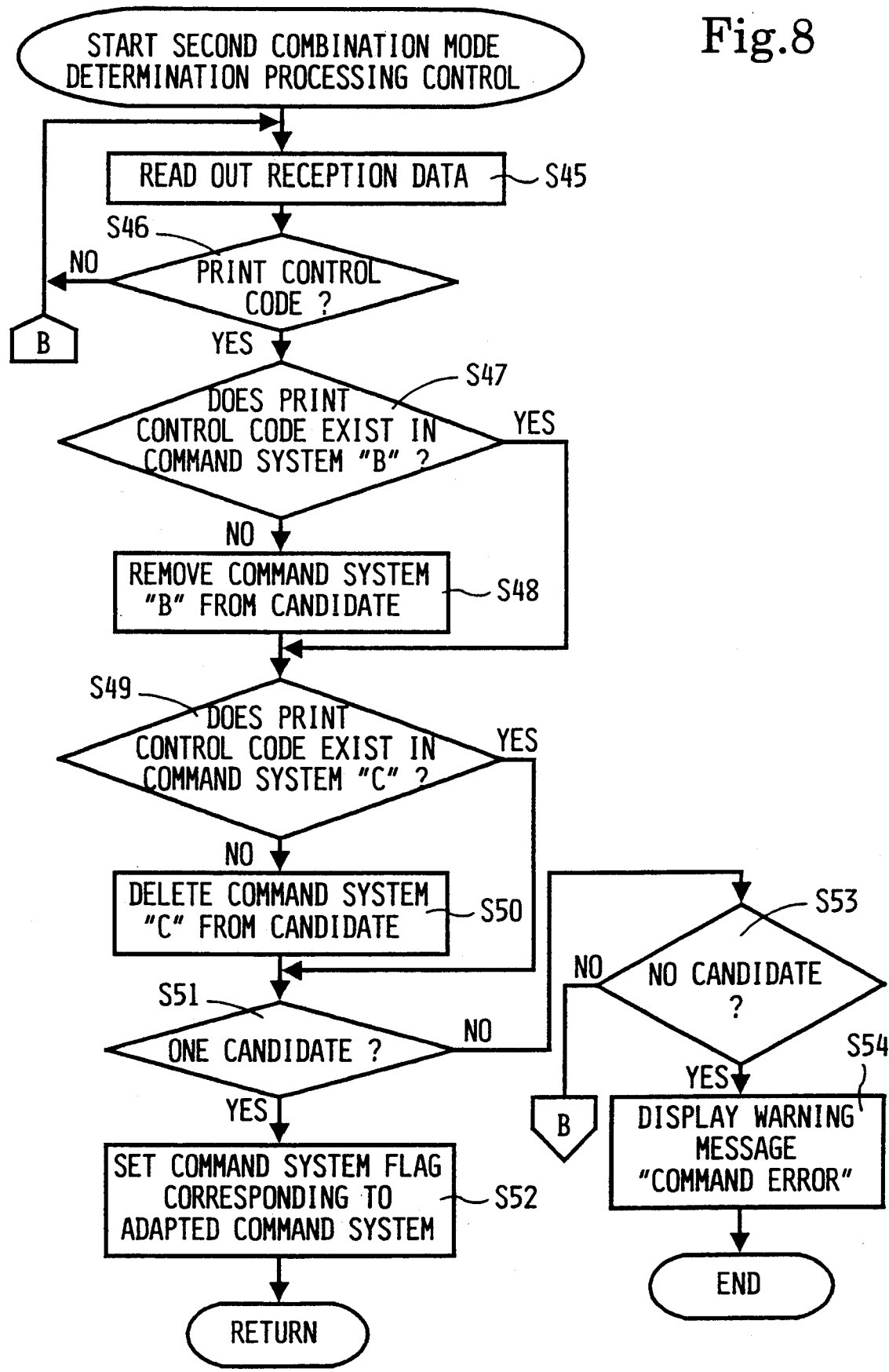
FIG. 8 is a flowchart for the routine of a second combination mode determination processing control.
Figure 9:
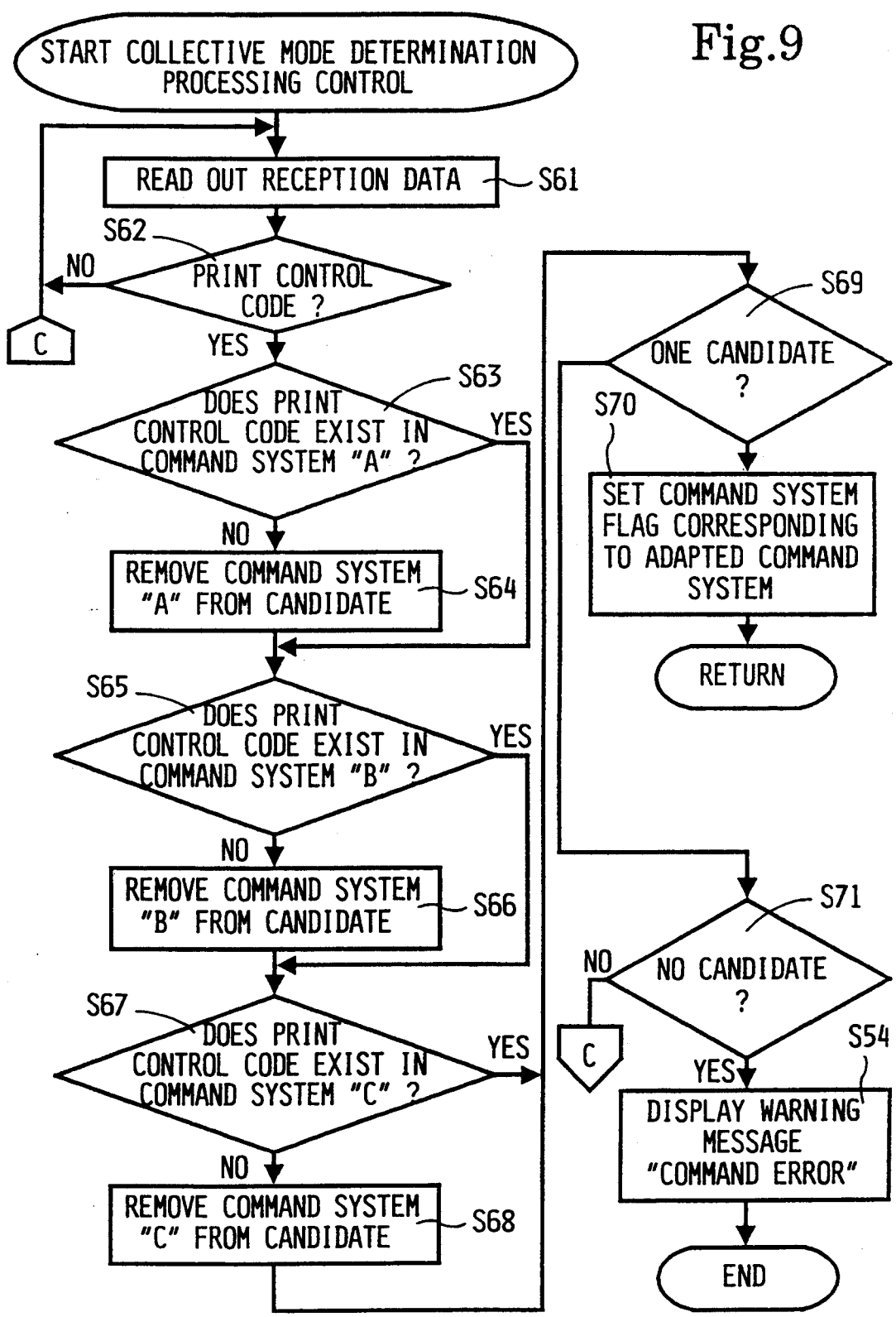
FIG. 9 is a flowchart for the routine of a collective mode determination processing control.

Next, the control system of the laser printer LP is constructed as shown in the block diagram of FIG. 4. A control unit 20 is provided to the laser printer LP, and the select key 11, the mode key 12, the enter key 13, the next display key 14 and the previous display key 15 as described above are connected to a microcomputer 25 of the control unit 20. The microcomputer 25 outputs a display driving signal to the display 10, and the driving operation of a laser print mechanism 35 of the laser printer LP is controlled by the control unit 20.

The configuration of the hardware of the control unit 20 is similar to that of a general laser printer, and the control unit 20 is equipped with a centronics port for receiving print data from external equipment through connection cables L1 and L2, interfaces 29 and 30 of RS-232-C, a video control circuit exclusively used for the laser print mechanism 35 and a DC controller circuit, and the microcomputer 25. The microcomputer 25 includes a CPU 26, a ROM 27 and a RAM 28, and further includes at least a display controller, an input/output interface and plural driving circuits.

The ROM 27 (corresponding to the operation mode storing means) is preliminarily stored with a control program for print control containing a command system determination processing control inherent to this application as described later. The ROM 27 also has three kinds of print control programs corresponding to command systems (A), (B) and (C) for the print control of the print data received from the external equipment (not shown). Also stored in the ROM 27 are plural display data such as a plurality of first operation mode name, second operation mode name, third operation mode name, etc.

The print control command systems A.B.C include a control command system optimally designed for document data, a control command system for a plotter used in a CAD field, and a control command system used for printing of complicated images (pictures), etc. In this embodiment, the print control program of the control command system A and the print control program of the control command system C are very similar to each other. However, the print control program of the control command system B is quite different from the print control programs of the control command system A and the control command system C.

Accordingly, the "command system (A+B)" is applied as the first combination mode and the "command system (B+C)" is applied as the second combination mode so that these very similar print control programs of the control command systems A and C are not contained in the same combination.

Further, the RAM 28 is equipped with a reception data memory for storing received print data by a predetermined amount, an operation mode memory for storing data of various operation modes corresponding to respective operation modes that are selectively set, a memory for temporarily storing a calculation result calculated in the CPU 26, a buffer, etc. The respective operation mode data stored in the operation mode memory are discriminatively stored at every hierarchy on the basis of the pointer value 1 KP of the first hierarchical pointer for successively indicating the operation modes of the first hierarchy, the pointer value 2 KP of the second hierarchical pointer for successively indicating the operation modes of the second hierarchy, and the pointer value 3 KP of the third hierarchy for successively indicating the set items of the third hierarchy.

A routine for print control is carried out in the microcomputer 25, which is described referring to the flowcharts shown in FIGS. 5 to 9. Reference character Si (i=11, 12, 13, . . . ) in the figures represents each step.

This control operation is started when the print data received from the external equipment is stored into the reception data memory of the RAM 28 and the print control command system determination processing control (see FIG. 6) is first carried out (S11).

When the automatic mode is not set on the basis of the pointer values 1 KP and 2 KP when this control operation is started (S21:No), a command system flag indicated by the pointer value 2 KP is set (S22). Then, the control is finished, and the program returns to the step S12 of the print control operation. In this case, a command system flag AF is set when the command system (A) is set, a command system flag BF is set when the command system (B) is set, and a command system flag CF is set when the command system (C) is set.

On the other hand, when the automatic mode is set (S21: Yes) and when the first combination mode is set on the basis of the pointer value 3 KP (S23:Yes), the first combination mode determination processing control (see FIG. 7) is carried out (S25).

When this control is started, the data is first read out from the reception data memory byte by byte (S31). If this data is not the print control code (S32:No), the next data is successively read out (S31 to S32). When the print control code is detected (S32:Yes) and if this print control code exists in the print control program of the control command system A (S33:Yes), the program goes to a step S35. However, if no print control code exists in the print control program of the control command system A (S33:No), control command system A is removed from the determination candidates (S34). Then, the program goes to a step S35.

Next, if this print control code exists in the print control program of the control command system B (S35:Yes), the program goes to a step S37. However, if it does not exist in the print control program of the control command system B, the control command system B is removed from the determination candidates (S36), and the program goes to the step S37. When only one determination candidate exists finally (S37:Yes), the control command system of this candidate is determined as a command system, which is adapted to the received print data. Then, the command system flag corresponding to the suitable command system is set (S38). Subsequently, this control and the determination processing control are finished, and then the program returns to the step S12.

However, when the determination candidate is not narrowed to one, that is, two or more candidates exist (S37, S39: No), the step S31 and steps subsequent thereto are carried out. On the other hand, if no determination candidate exists (S37:No, S39:Yes), a warning message "command error" is displayed on the display 10 (S40). Then, this control is finished, and the print control ceases.

When the second combination mode in the automatic mode is set (S21:Yes, S23:No, S24:Yes), the second combination mode determination processing control (see FIG. 8) is carried out (S26). This control is substantially similar to the first combination mode determination processing control, and it will be briefly described. With respect to the read-out print control code, it is successively determined whether the print control code exists in the print control programs of the control command systems B and C. If it does not exist, the corresponding control command system B or C is removed from the determination candidates (S45 to S50), the command system flag corresponding to the one suitable command system (determination candidate) is set (S51, S52). Then, the program returns to the step S12 similarly.

Further, when the collective mode in the automatic mode is set (S21:Yes, S23, S24:No), the collective mode determination processing control (see FIG. 9) is carried out (S27).

This control is substantially similar to the first combination mode determination processing control as described above, and it will be briefly described. With respect to the read-out print control code, it is successively determined whether the read-out print control code exists in each of the control command systems A, B and C. If it does not exist, the corresponding control command system A, B or C is removed from the determination candidates (S61 to S68), and the command system flag corresponding to the narrowed one suitable command system (determination candidate) is set (S69, S70). Subsequently, the program returns to the step S12.

When the command system flag AF is set in the print control (S12:Yes), the print data stored in the reception data memory is subjected to the print data processing using the print control program of the print control command system "A". Then, the print processing for controlling the driving of the laser print mechanism 35 is carried out (S13). Subsequently, this control is finished, and the program returns to the main routine.

Further, when the command system flag BF is set (S12:No, S14:Yes), the print data of the reception data memory is also subjected to the print processing using the print control program of the print control command system "B". Then, the program returns to the main routine.

Further, when the command system flag CF is set (S12, S14:No), the print data of the reception data memory is also subjected to the print processing using the print control program of the print control command system "C" (S16). Then, the program returns to the main routine.

As described above, the print control program of the command system adapted to the print control code contained in the received print data is determined from the print control programs, which are specified by "collective mode" or "first combination mode" or "second combination mode" when "automatic mode" is set. Accordingly, in the first or second combination mode, the respective print control programs are specified by the "first combination mode" and the "second combination mode" obtained by combining those print control programs that are not similar to each other. By setting this first or second combination mode, the print control program adapted to the print processing of the print data can be accurately determined.

A large number of print control programs can be installed into the ROM 27, and in this case, plural combination modes obtained by combining those print control programs that are not similar to one another can be provided. The second hierarchy of the "command system selection mode" as described above can be designed so that these plural combination modes can be set. It is needless to say that this invention is applicable to various kinds of printers such as a line printer of a dot print system designed to print a print data received through an interface, etc.

While advantageous embodiments have been chosen to illustrate the invention, it will be understood by those skilled in the art that various changes and modifications can be made therein without departing from the scope of the invention as defined in the appended claims.

What is claimed is:

1. A printer, comprising:
   a first memory storing a plurality of print control programs each having a different command system with a corresponding control code;
   a second memory storing input print data including a command system;
   a command system combiner that combines control programs in at least a first combination mode including a group of some of the control programs, a second combination mode including a group of other control programs and a collective mode including a group of all of the control programs;
   a determiner that compares the command systems of a group of said control programs from a selected one of the modes to the input command system in the second memory and determines a matching command system; and
   a printing mechanism that prints the input print data based on the control program with the matching command system.

2. The printer of claim 1 further comprising a mode setter that selectively sets an automatic mode for selecting a control program with a command system from the selected group that corresponds to the input command system in the second memory.

3. The printer of claim 1 further comprising an alarm that warns when no matching command system is determined.

4. A printer comprising:
   input print data means for inputting print data including a command system with a control code from external equipment;
   operation mode storing means for storing plural print control programs with control codes corresponding to different kinds of external equipment having different command systems for print control;
   print means for printing an image on a print medium using one of the print control programs from the operation mode storing means based on print data from the input print data means;
   setting means for selectively setting one of a collection mode that collectively specifies all of the print control programs and a combination mode that specifies a combination of some of the print control programs stored in said operation mode storing means;
   analyzing means for comparing the control code in the input print data to the control codes in the print control programs specified by the collective mode or the combination mode;
   determination means for determining at least one print control program from matching control codes compared by the analyzing means; and
   instructing means for instructing the print means to print using the print control program determined by the determination means.

5. The printer of claim 4 further comprising an automatic mode setting means for automatically activating the setting means.

6. The printer of claim 4 further comprising a warning means for warning when no matching control code is determined.

7. A method of selecting a print command program in a printer that corresponds to selected external equipment, comprising the steps of:
   storing a plurality of print control programs with different command systems and corresponding control codes;
   inputting print data including a control code from the selected external equipment;
   combining stored print control programs into groups having dissimilar control codes which includes selectively combining the programs into at least a first group of some of the print control programs, a second group of other print control programs and a collective group of all of the print control programs;
   selecting a group;
   comparing the control codes from the selected group of print control programs to the input control code;
   identifying a matching control code from the selected group and the input control code based on the comparison; and
   printing the input print data with the print control program with the identified control code.

8. The method of claim 7 further comprising the step of selectively setting an automatic mode for automatically combining print control programs into groups.

9. The method of claim 7 further comprising the step of generating a warning when no matching control code is selected.

* * * * *